United States Patent
Hirase

(10) Patent No.: US 7,024,052 B2
(45) Date of Patent: Apr. 4, 2006

(54) MOTION IMAGE DECODING APPARATUS AND METHOD REDUCING ERROR ACCUMULATION AND HENCE IMAGE DEGRADATION

(75) Inventor: Katsunori Hirase, Neyagawa (JP)

(73) Assignee: Sanyo Electric Co., Ltd., Moriguchi (JP)

(*) Notice: Subject to any disclaimer, the term of this patent is extended or adjusted under 35 U.S.C. 154(b) by 607 days.

(21) Appl. No.: 10/084,369

(22) Filed: Feb. 28, 2002

(65) Prior Publication Data
US 2002/0118757 A1    Aug. 29, 2002

(30) Foreign Application Priority Data
Feb. 28, 2001 (JP) .............................. 2001-054495

(51) Int. Cl.
G06K 9/36    (2006.01)

(52) U.S. Cl. ..................... 382/281; 708/400; 708/497

(58) Field of Classification Search ............... 382/281, 382/282; 708/400–405, 497
See application file for complete search history.

(56) References Cited

U.S. PATENT DOCUMENTS

| | | | | |
|---|---|---|---|---|
| 4,774,574 A | * | 9/1988 | Daly et al. ............... | 348/406.1 |
| 5,045,925 A | * | 9/1991 | Saito ..................... | 375/240.01 |
| 5,184,229 A | * | 2/1993 | Saito et al. ................. | 382/239 |
| 5,355,167 A | * | 10/1994 | Juri ....................... | 375/240.03 |
| 5,644,361 A | * | 7/1997 | Ran et al. .............. | 375/240.16 |
| 5,790,747 A | * | 8/1998 | Kanota et al. ............. | 386/123 |
| 5,825,424 A | * | 10/1998 | Canfield et al. ....... | 375/240.15 |
| 5,847,762 A | * | 12/1998 | Canfield et al. ....... | 375/240.15 |
| 6,072,496 A | * | 6/2000 | Guenter et al. ............. | 345/419 |
| 6,118,724 A | * | 9/2000 | Higginbottom ........ | 365/230.05 |
| 6,130,911 A | * | 10/2000 | Lei ....................... | 375/240.16 |
| 6,222,943 B1 | * | 4/2001 | Suga .......................... | 382/239 |
| 6,243,432 B1 | * | 6/2001 | Cheung et al. ............. | 376/283 |
| 6,272,180 B1 | * | 8/2001 | Lei ....................... | 375/240.16 |
| 6,584,154 B1 | * | 6/2003 | Wu ....................... | 375/240.16 |

FOREIGN PATENT DOCUMENTS

| | | |
|---|---|---|
| JP | 06-350993 | 12/1994 |
| JP | 2000-4440 | 1/2000 |
| JP | 2000-004440 | 1/2000 |
| JP | 2000-165861 | 6/2000 |
| JP | 2000-165875 | 6/2000 |

* cited by examiner

*Primary Examiner*—Kanjibhai Patel
*Assistant Examiner*—Manav Seth
(74) *Attorney, Agent, or Firm*—Armstrong, Kratz, Quintos, Hanson & Brooks, LLP.

(57) ABSTRACT

An Hadamard transform coding circuit changes a rounding method for each Hadamard transform block to prevent a rounding operation from providing an error biased in one direction, as seen in a picture in its entirety, for data compression and rounding. More specifically, after Hadamard transform there exist decimal parts 0.0, 0.25, 0.5 and 0.75, and if a numerical value is simply rounded off a probability would be increased that the numerical value is biased to increase in absolute value. Accordingly for 0.5 a rounding operation to provide an integer switches for each block. Thus a motion image decoding apparatus can be provided to reduce error accumulation and suppress flickering, color variation and other similar noticeable degradations.

10 Claims, 8 Drawing Sheets

FIG.1

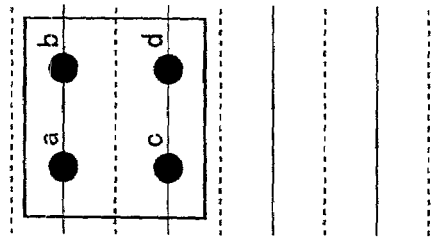
FIG.2(a)     FIG.2(b)     FIG.2(c)     FIG.2(d)
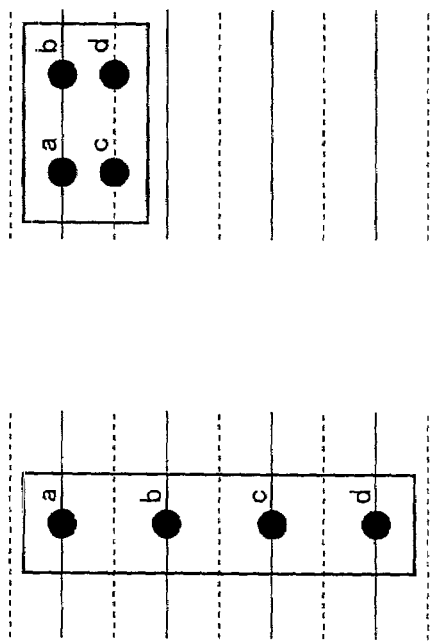
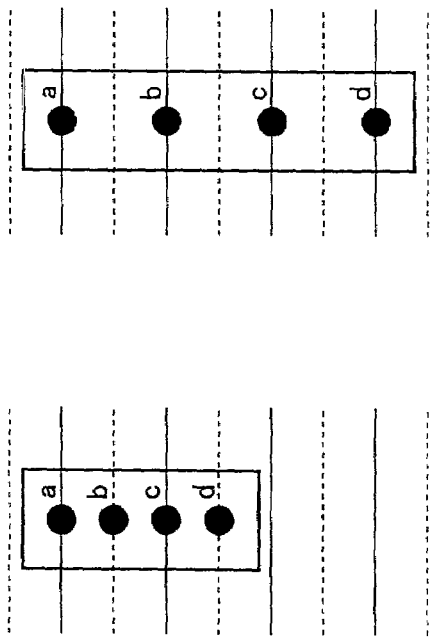
FRAME BASED PROCESS VERTICAL 4
FIELD BASED PROCESS VERTICAL 2
FRAME BASED PROCESS VERTICAL 2 BY HORIZONTAL 2
FIELD BASED PROCESS VERTICAL 2 BY HORIZONTAL 2

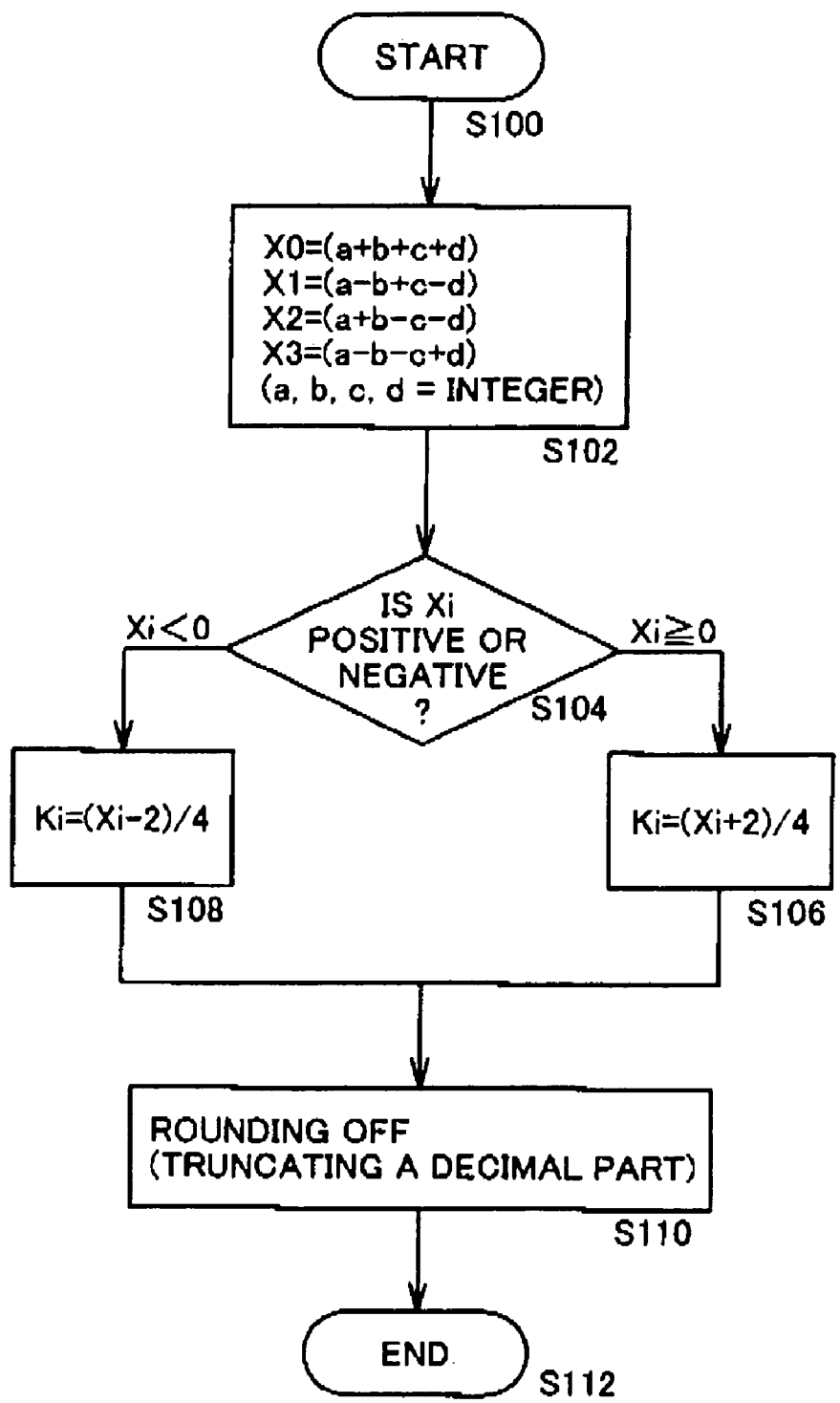

(T1: TYPE 1)
(T2: TYPE 2)
```

(T1: TYPE 1)
(T2: TYPE 2)
```

(T1: TYPE 1)
(T2: TYPE 2)
```

(T1: TYPE 1)
(T2: TYPE 2)
```

MOTION IMAGE DECODING APPARATUS AND METHOD REDUCING ERROR ACCUMULATION AND HENCE IMAGE DEGRADATION

BACKGROUND OF THE INVENTION

1. Field of the Invention

The present invention relates to configurations of motion image decoding methods and apparatuses decoding a signal coded and compressed in a system such as the Moving Picture Experts Group (MPEG) compression.

2. Description of the Background Art

In a field for example of digital TVs, MPEG systems are known as an image coding system used to code and compress image data.

The MPEG systems are represented by MPEG-1 and MPEG-2. MPEG-1 is only intended for non-interlaced images, whereas MPEG-2 is intended not only for non-interlaced images but also interlaced images.

Such MPEG coding adopts motion compensation prediction (temporal compression), discrete cosine transform (DCT) (spatial compression), and entropy coding (variable-length coding). In the MPEG coding, timebase predictive coding is initially effected for each macroblock serving as a unit, hereinafter referred to as a "unit macroblock." In MPEG-1 frame-based predictive coding is effected and in MPEG-2 frame- or field-based predictive coding is effected.

The macroblock is formed for example of a Y signal (a luminance signal) having a size of 16 (a number of pixels in a horizontal direction)×16 (a number of pixels in a vertical direction), a Cb signal (a color difference signal) having a size of 8 (a number of pixels in a horizontal direction)×8 (a number of pixels in a vertical direction), and a Cr signal (a color difference signal) having a size of 8 (a number of pixels in a horizontal direction)×8 (a number of pixels in a vertical direction).

Hereinafter, for the sake of convenience, only the Y signal will be described. Corresponding to a predictive coding system, there exist three types of pictures, an I picture, a P picture and a B picture. The following description will be provided in conjunction with intraframe predictive coding by way of example.

(1) I picture: a picture coded only from intraframe information. It is generated without using interframe predictive coding. In an I picture, any macroblock type is intraframe predictive coding using only intraframe information.

(2) P picture: a picture generated by effecting a prediction from an I or P picture. Typically in a P picture a macroblock type includes both intraframe coding using only intraframe information and forward interframe predictive coding providing a prediction from a previously reproduced image.

(3) B picture: a picture produced by bidirectional prediction and typically including the following macroblock types:

a) intraframe predictive coding using only intraframe information;

b) forward interframe predictive coding providing a prediction from a previously reproduced image;

c) backward interframe prediction coding providing a prediction based on future; and d) interpolative interframe predictive coding depending on both a prediction based on past and that based on future.

The interpolative interframe prediction herein refers to averaging out the two predictions, forward and backward predictions, between corresponding pixels.

As such, if an MPEG decoder effects a decoding process for all such macroblock types it would typically require two pictures of memory for a reference image memory for storage of an I or P picture.

To address this, Japanese Patent Laying-Open No. 2000-4440 discloses a motion image decoding method and apparatus contemplating a reduced memory capacity by compressing and thus storing data to a frame memory in decoding a motion image compressed for example in MPEG.

More specifically, Japanese Patent Laying-Open No. 2000-4440 discloses a motion picture decoding method which can be implemented by comprising a first step of inversely DCTing an MPEG compressed and coded signal and using resultant image data or the resultant image data and reference image data to generate first reproduced image data, a second step of Hadamard transforming and thus coding the first reproduced image data to generate second reproduced image data having an amount of data smaller bitwise than the first reproduced image data, a third step storing to a reference image memory the second reproduced image data obtained at the second step that is required to generate reference image data, and a fourth step using the second reproduced image data in the reference image memory to generate reference image data corresponding to the first reproduced image data.

In the above method, however, if orthogonal transform is followed by a rounding operation the rounding operation is effected in a single direction. This results in an increased probability of rounding-up in a picture, as seen in its entirety, and thus can provide error accumulation resulting in noticeable degradation.

SUMMARY OF THE INVENTION

The present invention contemplates a motion image decoding method and apparatus reducing error accumulation to reduce noticeable degradation in.

The present invention generally provides a motion image decoding apparatus for decoding compressed image data having been subjected to timebase predictive coding to compress a motion image, including: an image reproduction portion receiving the compressed image data to generate reproduced image data; an orthogonal transform and compression portion receiving an output from the image reproduction portion to effect orthogonal transform for each predetermined data transform block for data compression; and a storage receiving an output from the orthogonal transform and compression portion for storing therein reference image data for the predictive coding, the orthogonal transform and compression portion switching for each the predetermined data transform block a rounding system applied after the orthogonal transform.

The present invention in another aspect provides a method of decoding a motion image, including the steps of: generating first reproduced image data based on image data reproduced from a signal of compressed image data obtained through timebase predictive coding in compression of a motion image, or generating the first reproduced image data based on the reproduced image data and reference image data; switching a rounding system after orthogonal transform for each predetermined data transform block of the first reproduced image data, effecting orthogonal transform coding, and generating second reproduced image data having an amount of data smaller bitwise than the first reproduced image data; storing to a reference image memory the second reproduced image data required to generate the reference image data; and generating from the second reproduced image data stored in the reference image memory the reference image data corresponding to the first reproduced image data.

Thus the present invention can advantageously alleviate error accumulation in a picture, and seen in its entirety, to reduce flickering, color variation and other similar, noticeable degradations.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 1 is a block diagram schematically showing a configuration of an MPEG decoder 1000;

FIGS. 2(a)–2(d) represent a concept for illustrating a block division process;

FIG. 3 is a flow chart representing a process provided when Hadamard transform is followed by a rounding operation;

FIGS. 7, 8, 9(a) and 9(b), and 10(a) and 10(b) represent concepts for illustrating first, second, third and fourth exemplary arrangements, respectively, of Hadamard blocks of types 1 and 2.

DESCRIPTION OF THE PREFERRED EMBODIMENTS

Configuration of MPEG Decoder 1000

Figure 1:
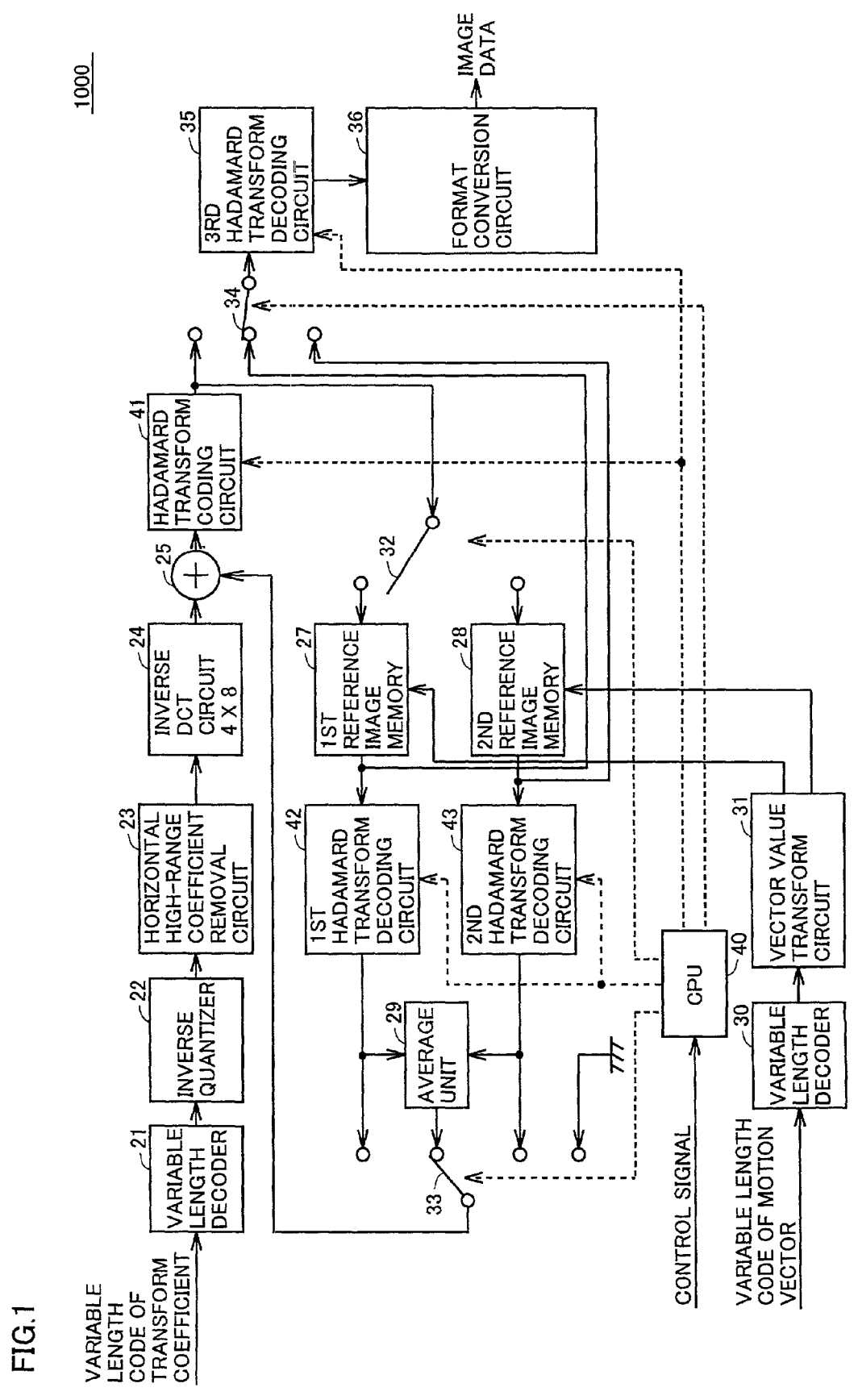
Figure 4:
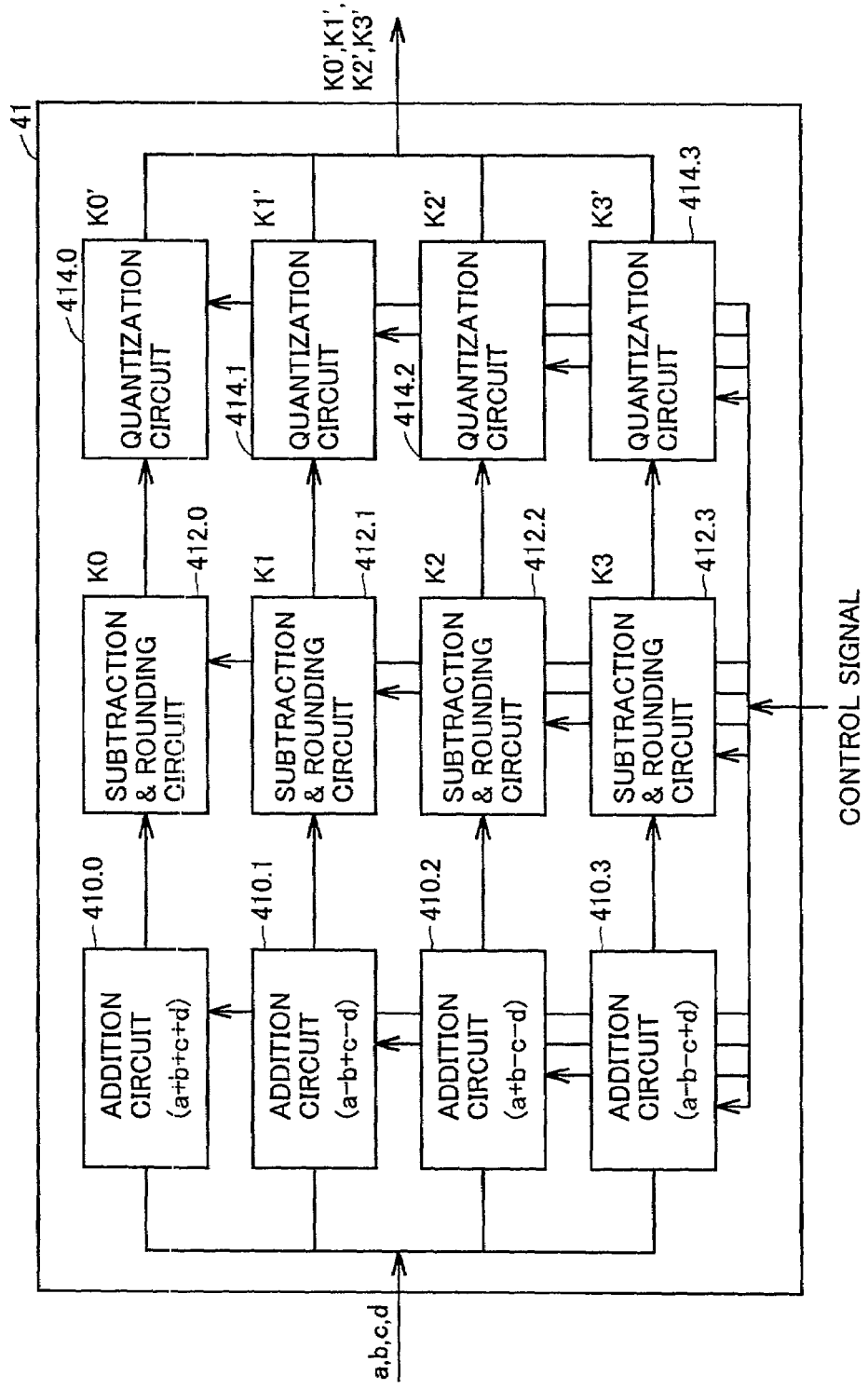
FIG. 4 is a block diagram schematically illustrating a configuration of an Hadamard transform coding circuit 41.

FIG. 1 is a block diagram schematically showing a configuration of an MPEG decoder 1000.

As shown in FIG. 1, a variable length code of a transform coefficient is transmitted to a variable length coder 21. A control signal including a block type is transmitted to CPU40. A variable length code of a motion vector is transmitted to and decoded by a variable-length decoder 30. A motion vector obtained in variable length decoder 30 is transmitted to a vector value transform circuit 31 and thus transformed to be horizontally one half in magnitude. The motion vector thus transformed is then transmitted to first and second reference image memories 27 and 28 as a control signal for controlling a position at which a reference image is cut out. A variable length coder 21 decodes a variable length code of a transform coefficient. An inverse quantizer 22 inversely quantizes a transform coefficient obtained from variable length coder 21 (a quantized DCT coefficient) and thus transforms it to a DCT coefficient. A horizontal high-range coefficient removal circuit (a coefficient reduction circuit) 23 recovers from a DCT coefficient generated by inverse quantizer 22 a DCT coefficient of 8×8 corresponding to a unit subblock of eight (a number of horizontal pixels) multiplied by eight (a number of vertical pixels), and circuit 23 also removes a DCT coefficient of a high range of a horizontal frequency of each subblock for transform to a DCT coefficient of 4 (in a direction of a horizontal frequency)×8 (in a direction of a vertical frequency) in number.

An inverse DCT circuit 24 subjects to inverse DCT of 4×8 a DCT coefficient of 4×8 in number generated by horizontal high-range coefficient removal circuit 23 and thus compresses an original unit subblock's data to be horizontally one half to generate data of 4 (a number of pixels in the horizontal direction)×8 (a number of pixels in the vertical direction) in number.

Based on image data corresponding to four unit subblocks thus obtained to form one macroblock, there is generated reproduced image data or prediction error data of one unit macroblock having a horizontal direction compressed to be one half and hence 8×16.

The amount of data a unit macroblock obtained via inverse DCT circuit 24 is thus half that of image data of a unit macroblock of an original image.

To the prediction error data generated by inverse DCT circuit 24 and having a horizontal direction compressed to one half to provide 8×16, an adder 25 adds reference image data corresponding to the macroblock type of interest (i.e., reference image data of a unit macroblock of 8×16, having its horizontal direction compressed to one half) to generate reproduced image data. The reference image data is transmitted to adder 25 via a switch 33. It should be noted, however, that the reference image data is not added if inverse DCT circuit 24 outputs reproduced image data for intraframe predictive coding.

First reproduced image data of a unit macroblock obtained via inverse DCT circuit 24 and adder 25 and having a direction compressed to one half to provide 8×16, is transmitted to Hadamard transform coding circuit 41.

Hadamard transform coding circuit 41 effects 4th-order Hadamard transform and quantization. Hadamard transform coding circuit 41 divides reproduced image data of a unit macroblock of 8×16 into blocks.

FIGS. 2(a)–2(d) show concepts for illustrating such a block division process.

If an image signal input is an interlaced image then as shown in FIG. 2(d) the first reproduced image data is divided into a block of 2×2 formed of two groups each formed of two horizontally adjacent pixels and respectively arranged on two odd-numbered, adjacent lines and a block of 2×2 formed of two groups each formed of two horizontally adjacent pixels and respectively arranged on two even-numbered, adjacent lines.

If an image signal input is a progressive image then as shown in FIG. 2(c) the first reproduced image data is divided into a block of 2×2 formed of two groups each formed of two horizontally adjacent pixels and respectively arranged on two vertically adjacent lines.

For various types of image signal input, the block divisions are switched in response to a control signal output from CPU 40.

Note that if an image input is a progressive image then as shown in FIG. 2(a) the first reproduced image data may be divided into a block of 4×1 formed of four vertically adjacent pixels and if an image input is an interlaced image then as shown in FIG. 2(d) the first reproduced image data may be divided into a block of 2×2.

Furthermore if an image input is an interlaced image, then, as shown in FIG. 2(b), the first reproduced image data may be divided into a block of 4×1 formed of four pixels arranged vertically on four odd-numbered, adjacent lines and the first reproduced image data may be divided into a block of 4×1 formed of four pixels arranged vertically on four even-numbered, adjacent lines.

If in each block each pixel has a value (of eight bits) represented by a, b, c and d, as shown in FIG. 2(c) or 2(d), then for each block an Hadamard transform is effected, as represented in the following expressions (1)–(4):

$$K0=(a+b+c+d)/4 \quad (1)$$

$$K1=(a-b+c-d)/4 \quad (2)$$

$$K2=(a+b-c-d)/4 \quad (3)$$

$$K3=(a-b-c+d)/4 \quad (4)$$

Although Hadamard transform should be associated with a coefficient of $1/(4\times\sqrt{2})$, it is herein associated with a coefficient of ¼ to simplify the process.

Then Hadamard transform coding circuit 41 effects quantization. Herein, to effect a compression into one-half bitwise, 16 bits are assigned for the total of the values of four pixels in a single block.

For example, coefficient K0 is assigned eight bits, coefficients K1 and K2 are each assigned four bits, and coefficient K3 is assigned 0 bit. Thus for K0 is adopted an exact value calculated by equation (1). K3 is neglected regardless of equation (4).

For K1 or K2, a value of eight bits obtained by equations (2) to (3), −128 to +127, is transformed to a value of four bits, −8 to +7, in accordance with a quantization and inverse quantization table.

K0, K1 and K2 quantized in value are represented as K0', K1' and K2', respectively, for the sake of illustration.

The 4th-order Hadamard transform and quantization above provides a unit macroblock of 8×16 of second reproduced image data.

The second reproduced image has half the amount of data of the first reproduced image.

Thus Hadamard transform coding circuit 41 provides a unit macroblock of second reproduced image data having one fourth the amount of the image data of a unit macroblock of the original image of interest.

If the second reproduced image data of a unit macroblock obtained via Hadamard transform coding circuit 41 is reproduced image data for a B picture then the reproduced image data is transmitted to a switch 34.

If the second reproduced image data of a unit macroblock obtained via Hadamard transform coding circuit 41 is reproduced image data for a I or P picture then the reproduced image data is transmitted via a switch 32 and stored to the first or second reference image memory 27 or 28. The first or second reference image memory 27 or 28 stores one fourth of an amount of image data conventionally stored. Switch 32 is controlled by CPU40.

A first Hadamard transform decoding circuit 42 applies inverse quantization and Hadamard inverse transform to the 8×16-unit macroblock, second reproduced data read from the first reference image memory 27 and thus generates reference image data for the first reproduced image.

More specifically, quantized values K0', K1', K2' configuring the second reproduced image data read from the first reference image memory 27 are transformed to inversely quantized values K0", K1", K2". More specifically, K0' inversely quantized in value, or K0", equals K0'.

K1' and K2' inversely quantized in value, or K1" and K2", are obtained in accordance with a quantization and inverse quantization table.

When inversely quantized values K0", K1", K2" are thus obtained, the following expressions (5) to (8) are used to effect Hadamard inverse transform. It should be noted, however, that in this example, K3" is handled as 0.

$$Y0=K0''+K1''+K2''+K3'' \quad (5)$$

$$Y1=K0''-K1''+K2''-K3'' \quad (6)$$

$$Y2=K0''+K1''-K2''-K3'' \quad (7)$$

$$Y3=K0''-K1''-K2''+K3'' \quad (8)$$

wherein K0", K1", K2" correspond to K0, K1, K2, K3 quantized/inversely quantized.

Thus the second reproduced image data of a unit macroblock read from the first reference image memory 27 is transformed to reference image data corresponding to the first reproduced image data.

A second Hadamard transform decoding circuit 43 applies inverse quantization and Hadamard transform, similarly as described above, to reproduced image data of a unit macroblock of 8×16 read from the second reference image memory 28 and thus generates reference image data corresponding to the first reproduced image data.

An average unit 29 averages out image data read from the first and second Hadamard transform decoding circuits 42 and 43 to generate reference image data of a unit macroblock of 8×16 for use in interpolative interframe predictive coding.

Switch 33 is controlled by CPU40, as follows:

If inverse DCT circuit 24 outputs reproduced image data for intraframe predictive coding then switch 33 has a shared terminal thereof switched to a ground terminal.

If inverse DCT circuit 24 outputs prediction error data for forward interframe predictive coding or that for backward interframe predictive coding then switch 33 connects the shared terminal to either a terminal receiving reference image data from the first Hadamard transform decoding circuit 42 or a terminal receiving reference image data from the second Hadamard transform decoding circuit 43.

Note that if a reference images is read from reference image memory 27, 28, a motion vector obtained via vector value transform circuit 31 is based on to control a position at which it is cut out. Vector value transform circuit 31 transforms a motion vector to be horizontally one half in magnitude because Hadamard transform coding circuit 41 transmits to reference image memories 27, 28 unit macroblock image data having a horizontal direction compressed to be one half.

If inverse DCT circuit 24 outputs prediction error data for interpolative interframe predictive coding then switch 33 has the shared terminal switched to select a terminal receiving an output provided from average unit 29.

Switch 34 is controlled by CPU40 so that the second reproduced image data transmitted from Hadamard transform coding circuit 41 to switch 34 for a B picture, the second reproduced image data stored in reference image memory 27 for an I or P picture, and the second reproduced image data stored in reference image memory 28 for an I or P picture are output in the same order as the original image of interest.

The second reproduced image data output via switch 34 is inversely quantized and Hadamard-transformed, similarly as described above, by a third Hadamard transform decoding circuit 35 and thus transformed to image data corresponding to the first reproduced image data, and then transmitted to a format conversion circuit 36.

Format conversion circuit 36 receives image data from the third Hadamard transform decoding circuit 35 and converts the image data in format to correspond to the number of horizontal and vertical scanning lines of the monitor device of interest. The image data thus converted in format is transmitted to the monitor device.

This allows the first and second reference image memories 27 and 28 to have one fourth of their conventional capacities.

Operation of Hadamard Transform Coding Circuit 41

Disadvantage of Simple Rounding Operation

FIG. 3 is a flow chart representing a process provided when the FIG. 1 Hadamard transform coding circuit 41 effects an operation corresponding to expressions (1) to (4) and the operation is then followed by a simple rounding operation. As will be described hereinafter, such a simple rounding operation cannot provide sufficient image quality.

As shown in the FIG. 3 flow chart, Hadamard transform starts (step S100) and when the Hadamard transform is effected (step S102) the Hadamard transform's K0, K1, K2, K3 after the decimal point can have values of 0.00, 0.25, 0.50, 0.75.

Accordingly then to round a value off it is determined whether Xi is positive or negative, wherein i=0, 1, 2, 3 (step S104) and based thereon the two methods as described hereinafter are used to round it off.

Initially, if (a+b+c+d), (a−b+c−d), (a+b−c−d), (a−b−c+d) equal 0 or more, then Xi has two added thereto and it is then divided by four and then has its decimal part truncated and it is thus rounded off (step S106).

If (a+b+c+d), (a−b+c−d), (a+b−c−d), (a−b−c+d) are negative then Xi has two subtracted therefrom and it is then divided by four and then has its decimal part truncated and it is thus rounded off (step S108).

Then it is rounded to be an integer. An decimal part 0.25 is truncated and decimal parts 0.50, 0.75 rounded up to provide an integer (step S110) and thus the process ends (step S110). Such a rounding operation as steps S104–S110 results in the decimal part of 0.25 alone being truncated. Thus in a picture, as seen in its entirety, a numerical value is rounded to be biased to have an increased absolute value.

This results in flickering, color variation and other similar, noticeable degradations.

Configuration of Hadamard Transform Coding Circuit 41 of the Present Invention To overcome the disadvantages above, Hadamard transform coding circuit 41 is configured, as described hereinafter, to effect a rounding operation.

FIG. 4 is a schematic block diagram for illustrating a configuration of Hadamard transform coding circuit 41.

As shown in FIG. 4, Hadamard transform coding circuit 41 includes addition circuits 410.1 to 410.3 effecting addition processes corresponding to Hadamard transform expressions (1) to (4), respectively, subtraction and rounding circuits 412.0 to 412.3 receiving respective outputs from addition circuits 410.1 to 410.3 for rounding and subtraction operations, as will be described hereinafter, and quantization circuits 414.0 to 414.3 receiving respective outputs from subtraction and rounding circuits 412.0 to 412.3 to effect quantization, as has been described previously, after Hadamard transform.

Addition circuits 410.1 to 410.3, subtraction and rounding circuits 412.0 to 412.3, and quantization circuits 414.1 to 414.3 are controlled by a control signal output from CPU40. Herein, subtraction and rounding circuits 412.0 to 412.3 output coefficients K0–K3 corresponding to expressions (1)–(4), and quantization circuits 414.0 to 414.3 provide outputs which in turn serve as the above described coefficient values K0', K1', K2', K3'.

Figure 5:
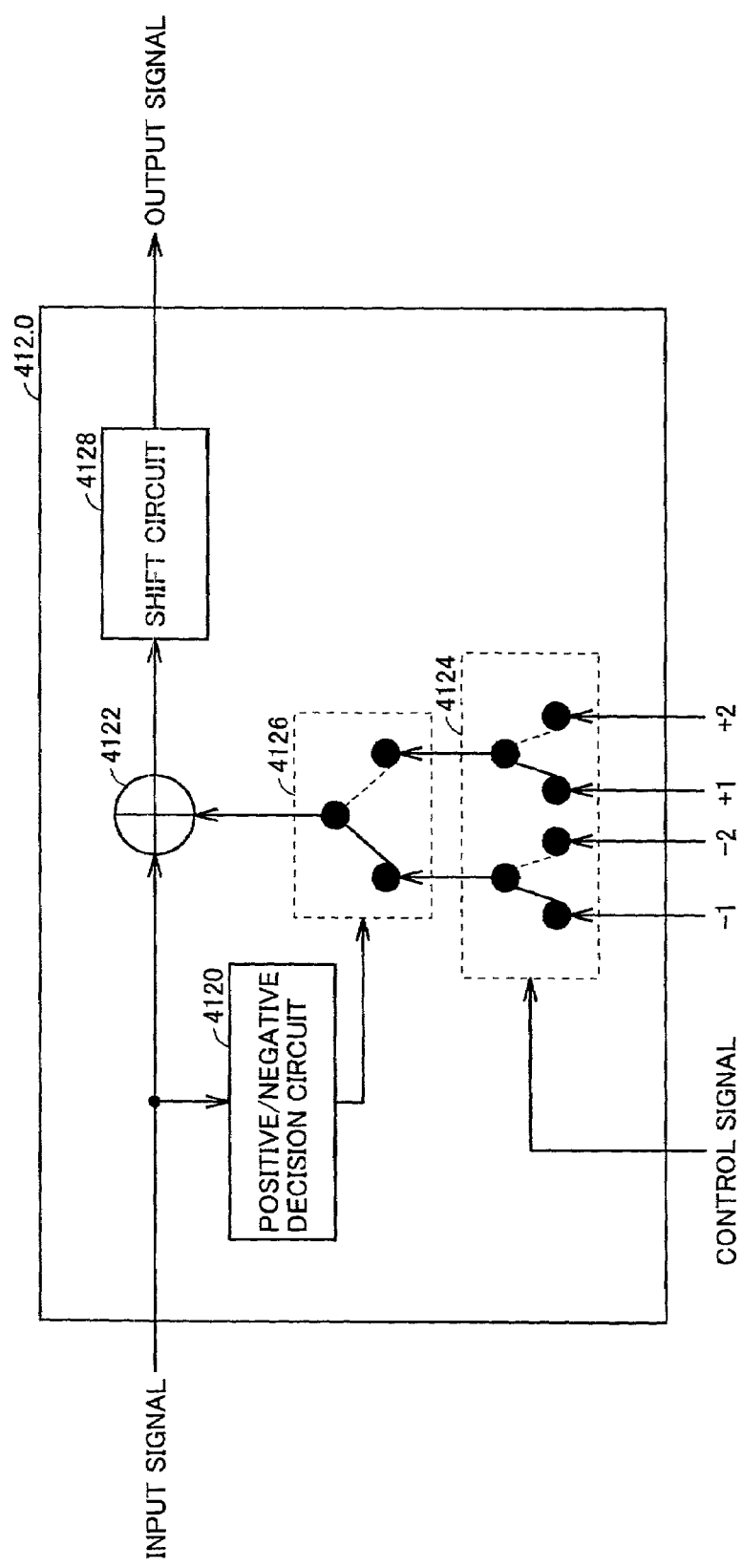
FIG. 5 is a block diagram schematically illustrating a configuration of a subtraction and rounding circuit 412.0 shown in FIG. 4.

FIG. 5 is a schematic block diagram for illustrating a configuration of the FIG. 4 subtraction and rounding circuit 412.0. The other subtraction and rounding circuits 412.1 to 412.3 are basically similarly configured.

As shown in FIG. 5, subtraction and rounding circuit 412.0 includes a circuit 4120 receiving an input signal from addition circuit 410.0 to determine whether it is positive or negative, an adder 4122 having one input receiving an input signal from addition circuit 410.0, a switch circuit 4124 operative in response to a control signal to selectively output one of fixed levels −1 and −2 and one of fixed levels +1 and +2, a switch circuit 4126 receiving an output of switch circuit 4124 and selecting either a selected one of the fixed levels −1 and −2 or a selected one of the fixed levels +1 and +2 for input to the other input of adder 4122, and a shift circuit 4128 receiving an output of adder 4122 and effecting a 2-bit shift operation to effect a division by four.

Figure 6:
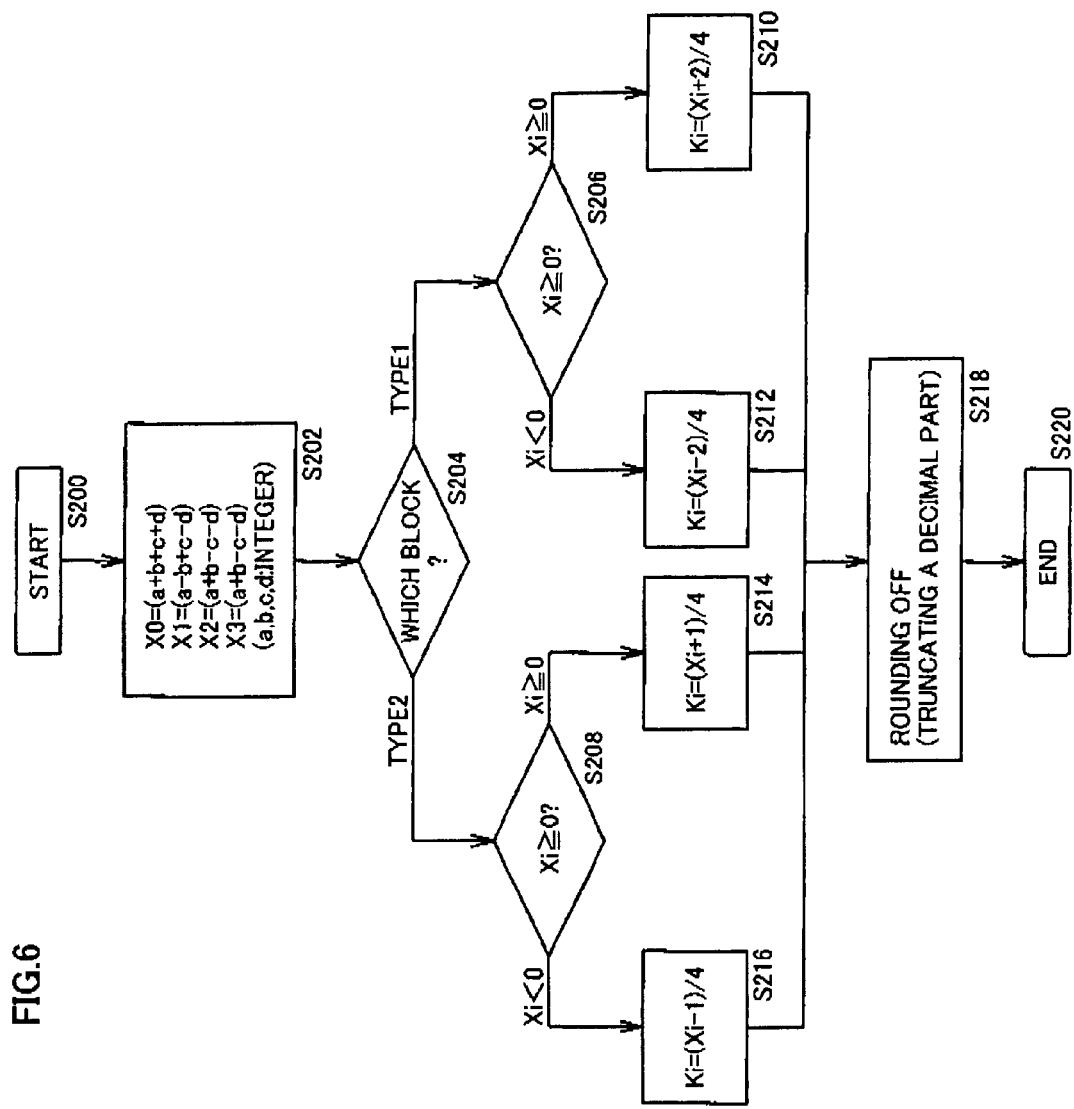
FIG. 6 is a flow chart illustrating an operation of an Hadamard transform coding circuit 41 in accordance with the present invention.

FIG. 6 is a flow chart for illustrating an operation of Hadamard transform coding circuit 41 in accordance with the present invention.

As shown in FIG. 6, when an Hadamard transform process starts (step S200), initially for a pixel value input to addition circuits 410.0–410.3 a corresponding addition operation is effected (step S202).

Then, as will be described hereinafter, is determined a position of an Hadamard block to which the input pixel value belongs to (step S204), and for each Hadamard block the value of interest is rounded, with a threshold value varying, to be an integer, as will be described hereinafter.

For each type of Hadamard block thus classified, a process is provided, as will be described hereinafter:

For an Hadamard block of type 1:

if(a+b+c+d), (a−b+c−d), (a+b−c−d), (a−b−c+d) are 0 or more (step S206) then Xi has two added thereto and is then divided by four (step S210) and it has its decimal part truncated and it is thus rounded off (step S218); and if (a+b+c+d), (a−b+c−d), (a+b−c−d), (a−b−c+d) are negative (step S206) then Xi has two subtracted therefrom and is then divided by four (step S212) and it has its decimal part truncated and it is thus rounded off (step S218).

A decimal part of 0.25 is truncated and 0.50 and 0.75 rounded up and thus round off.

For an Hadamard block of type 2:

if(a+b+c+d), (a−b+c−d), (a+b−c−d), (a−b−c+d) are 0 or more (step S208) then Xi has one added thereto and is then divided by four (step S214) and it has its decimal part truncated and it is thus rounded off (step S218); and if (a+b+c+d), (a−b+c−d), (a+b−c−d), (a−b−c+d) are negative (step S208) then Xi has one subtracted therefrom and is then divided four, and has its decimal part truncated and thus rounded off (step S218).

Decimal parts of 0.25 and 0.50 are truncated and 0.75 rounded up and thus rounded off.

Figure 7:
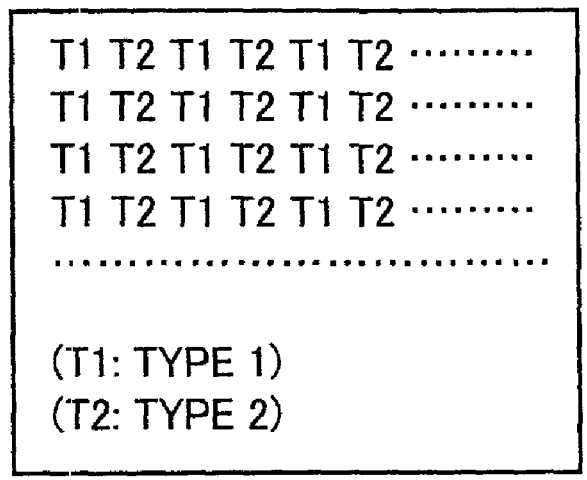
Figure 8:
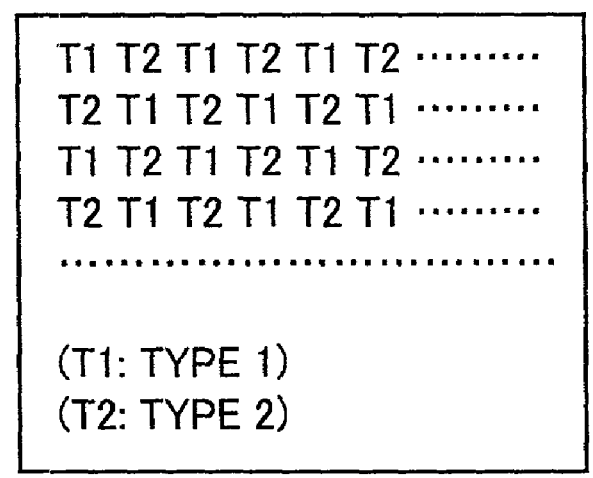

FIGS. 7, 8, 9(*a*) and 9(*b*), and 10(*a*) and 10(*b*) represent a concept for illustrating exemplary arrangements of Hadamard blocks of such types 1 and 2 as described above.

Type 1 and type 2 can be switched for each vertical column, as shown in FIG. 7.

Furthermore, as shown in FIG. 8, they can also be switched in a checker board.

Furthermore, with reference to FIGS. 9(*a*) and 9(*b*), the switching system of FIG. 7 may be switched, as shown in FIGS. 9(*a*) and 9(*b*), alternately for each frame.

Furthermore, with reference to FIGS. 10(*a*) and 10(*b*), the switching system of FIG. 8 may be switched, as shown in FIGS. 10(*a*) and 10(*b*), alternately for each frame.

Thus in a picture, as seen in its entirety, error accumulation can be alleviated, and flickering, color variation and other similar noticeable degradations can be reduced. If a value has a decimal part is 0.5 then for each block alternately it is rounded down and up and thus rounded off to be an integer. More specifically, by switching for each block a rounding operation of the methods of types 1 and 2 indicated hereinafter, for type 1 the rounding operation is biased to increase a numeral value in absolute value and for type 2 it is biased to decrease a numerical value in absolute value, and the picture of interest, as seen in its entirety, is thus not biased.

While the above description has been provided in conjunction with processing a luminance signal, a color difference signal can also be similarly processed. Alternatively, for the luminance signal the FIG. 6 method can be used for rounding, and for the color difference signal the FIG. 6 method can be used for a DC component to switch a rounding operation for each Hadamard block and for an AC component to effect truncation for all Hadamard blocks.

While the above description has been provided in conjunction with orthogonal transform, Hadamard transform in particular, by way of example, to utilize the fact that a transformed value has its uniqueness maintained, the present invention is not limited thereto an any other orthogonal transform is applicable to the present invention if it is possible to provide data compression based on a bias in value of a result of the orthogonal transform that is effected for each block, as has been described with reference to FIGS. 2(a) to 2(d).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion image decoding apparatus for decoding compressed image data obtained through timebase predictive coding effected to compress a motion image, comprising:
   an image reproduction portion receiving said compressed image data to generate reproduced image data;
   an orthogonal transform and compression portion receiving an output from said image reproduction portion to effect orthogonal transform for each predetermined data transform block for data compression, said orthogonal transform and compression portion switching for each said predetermined data transform block a rounding system applied after said orthogonal transform, said switching of the rounding system corresponding to alternating between a first rounding process including adding a first value to or subtracting the first value from a numeral value and dividing result by a second value, and a second rounding process including adding a third value to or subtracting the third value from the numeral value and dividing result by the second value, the third value being equal to two times the first value; and
   a storage receiving an output from said orthogonal transform and compression portion for storing therein reference image data for said predictive coding.

2. The apparatus according to claim 1, wherein said orthogonal transform and compression portion effects Hadamard transform as said orthogonal transform.

3. The apparatus according to claim 1, wherein said orthogonal transform and compression portion switches for each said predetermined data transform block a level of a threshold value for a rounding operation effected after said orthogonal transform.

4. The apparatus according to claim 3, wherein said orthogonal transform and compression portion effects Hadamard transform as said orthogonal transform.

5. The apparatus according to claim 1, wherein:
   said compressed image data includes a luminance signal and a color difference signal; and
   for said luminance signal said orthogonal transform and compression portion switches for each said predetermined data transform block said rounding system applied after said orthogonal transform, and for said color difference signal for a DC component said orthogonal transform and compression portion switches for each said predetermined data transform block said rounding system applied after said orthogonal transform and for an AC component effects truncation for any said predetermined data transform block.

6. The apparatus according to claim 5, wherein said orthogonal compression and transform portion effects Hadamard transform as said orthogonal transform.

7. A method of decoding a motion image, comprising the steps of:
   generating first reproduced image data based on source image data reproduced from a signal of compressed image data obtained through timebase predictive coding in compression of a motion image, or generating said first reproduced image data based on the reproduced source image data and reference image data;
   switching a rounding system after orthogonal transform for each predetermined data transform block of said first reproduced image data, effecting orthogonal transform coding, and generating second reproduced image data having an amount of data smaller bitwise than said first reproduced image data, said switching of the rounding system corresponding to alternating between a first rounding process including adding a first value to or subtracting the first value from a numeral value and dividing result by a second value, and a second rounding process including adding a third value to or subtracting the third value from the numeral value and dividing result by the second value, the third value being equal to two times the first value;
   storing to a reference image memory said second reproduced image data required to generate said reference image data; and
   generating from said second reproduced image data stored in said reference image memory said reference image data corresponding to said first reproduced image data.

8. The method according to claim 7, wherein in the step of switching, Hadamard transform is effected as said orthogonal transform.

9. The method according to claim 7, wherein in the step of switching, for each said predetermined data transform block after said orthogonal transform said rounding has a threshold value switched in level.

10. The method according to claim 9, wherein in the step of switching, Hadamard transform is effected as said orthogonal transform.

* * * * *